Dec. 15, 1970  R. R. NEEBEL ET AL  3,546,737
LOIN PULL AND RIB CUT MACHINE
Filed April 8, 1968  13 Sheets-Sheet 11

Inventors:
Richard R. Neebel
Clarence L. Harms
James D. Neebel
Richard E. Doerfer
By Bair, Freeman & Molinare
Attys.

Dec. 15, 1970 R. R. NEEBEL ET AL 3,546,737
LOIN PULL AND RIB CUT MACHINE
Filed April 8, 1968 13 Sheets-Sheet 12

Inventors:
Richard R. Neebel, Clarence L. Harms,
James D. Neebel & Richard E. Doerfer
By Bair, Freeman & Molinare
Attys.

United States Patent Office 3,546,737
Patented Dec. 15, 1970

3,546,737
LOIN PULL AND RIB CUT MACHINE
Richard R. Neebel, Waterloo, Clarence L. Harms, Cedar Falls, James D. Neebel, Denver, and Richard E. Doerfer, Waterloo, Iowa, assignors to Doerfer Corporation, Cedar Falls, Iowa, a corporation of Iowa
Filed Apr. 8, 1968, Ser. No. 719,320
Int. Cl. A22b 5/20
U.S. Cl. 17—1
40 Claims

ABSTRACT OF THE DISCLOSURE

A machine for automatically performing loin pulling and rib cutting operations on pork sides, the loin pulling operation including a rib sawing operation, a loin cutting operation and a loin push-off operation, and the rib cutting operation leaving the ribs on the belly part of the pork side. The machine automatically feeds pork sides, and cuts, saws and mechanically separates portions thereof.

BACKGROUND AND SUMMARY OF THE INVENTION

One object of the invention is to provide a functional machine for automatically completing all of the above enumerated operations with less manual labor and more uniformity of the resulting pork cuts than are possible by trained operators.

Another object is to provide a mechanism to saw through the ribs in a self-determined direction depending on the size and shape of the pork sides.

Still another object is to cut the loin in a predetermined pattern conforming to the natural configuration of the pork side and with a controlled quantity of fatback.

A further object is to automatically remove the loin from the remainder of the side and allow such remainder to proceed to the rib cutting mechanism of the machine.

Still a further object is to automatically cut out the remaining ribs from the side in a plane as close to the ribs as possible and with a blade which is withdrawn in a line corresponding with the ends of the ribs, thus minimizing the meat lost with the ribs.

With these and other objects in view, our invention consists in the construction, arrangement and combination of the various parts of our loin pull and rib cut machine, whereby the objects above contemplated are attained, as hereinafter more fully set forth, pointed out in our claims and illustrated in detail on the accompanying drawings, wherein:

LOIN PULL OPERATION

Figure 1:
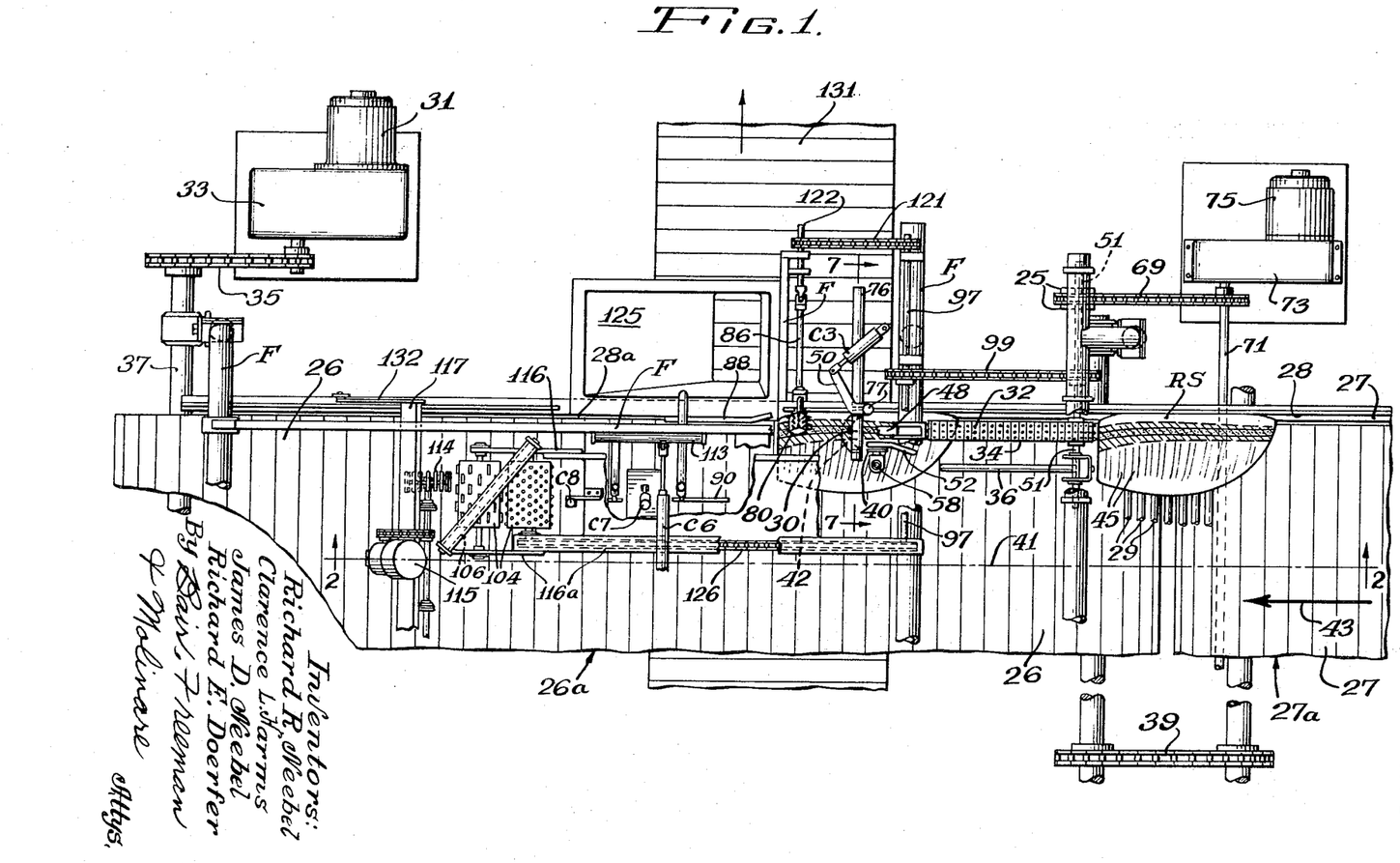
FIG. 1 is a plan view of a loin pull and rib cut machine embodying our invention, slightly more than one-half (the right half) of the machine being shown.
Figure 2:
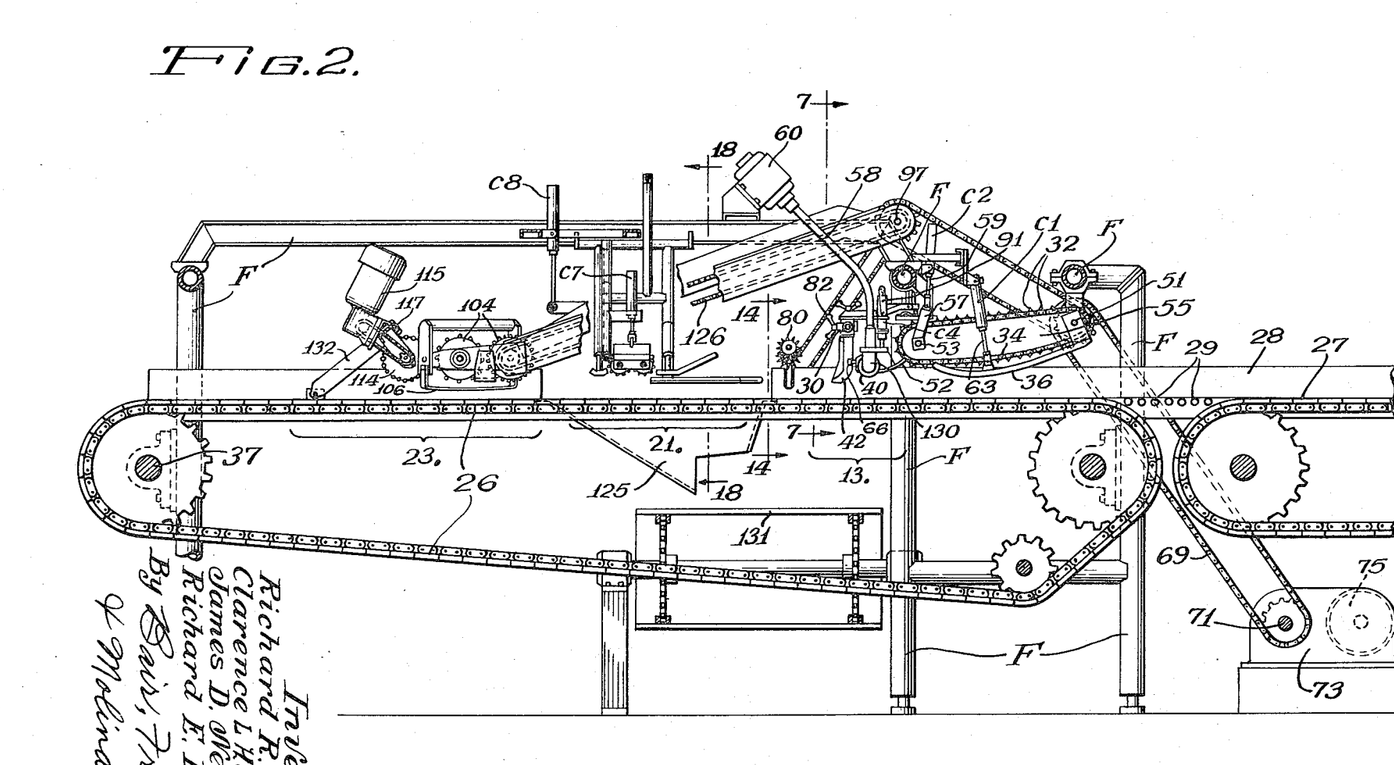
FIG. 2 is a vertical sectional view on the line 2—2 of FIG. 1.

On the accompanying drawings we have used the reference numeral 26 to designate a pork side conveyor to which right pork sides (RS) may be delivered by an infeed conveyor 27. A series of rollers 29 are illustrated in FIGS. 1 and 2 to span the space between the discharge end of the conveyor 27 and the intake end of the conveyor 26. The conveyors 26 and 27 may be driven in synchronism with each other and in any suitable manner such as by a motor 31 driving a speed reducer 33, and through a chain 35 driving a shaft 37 as shown in FIG. 1. FIG. 1 also illustrates a chain drive 39 between the intake end of the conveyor 26 and the discharge end of the conveyor 27.

The direction of travel of the conveyors is in accordance with an arrow 43 adjacent the right hand end of FIG. 1. Considering our machine as oriented in accordance with the arrow 43, the left hand edges of the conveyors 26 and 27 are cut off with broken lines 26a and 27a. At 41 the fore-and-aft center line of the machine is indicated.

The mechanism of our machine in FIG. 1 is somewhat diagrammatically illustrated with reference characters F indicating various parts of a stationary frame. Such mechanism is for the purpose of automatic loin pulling and rib cutting operations for right pork sides whereas the rest of the machine (to the left of the center line 41) is identical except it is a mirrored opposite of that portion of the machine to the right of the center line and is for left pork sides. We therefore deem it unnecessary to illustrate the left half of the machine.

Figure 4:
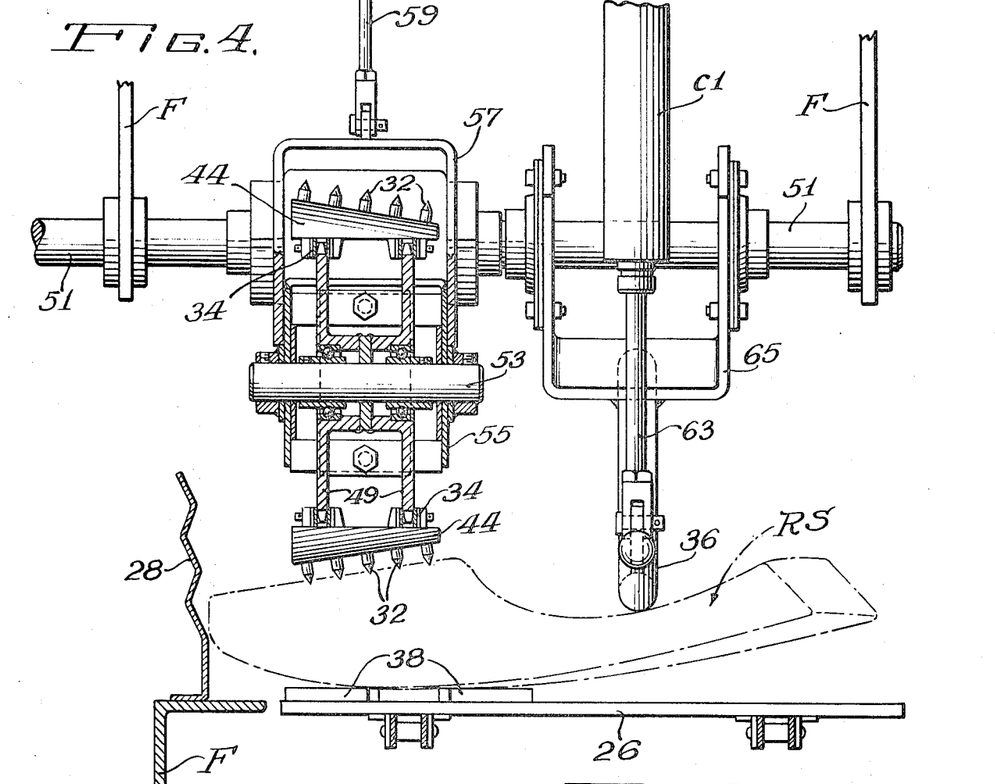
FIG. 4 is a vertical sectional view on the line 4—4 of FIG. 3.

In FIG. 1 we show right pork sides RS to indicate the position thereof on the infeed conveyor 27 in relation to a side rail 28 against which the operator of the machine holds the side RS with the backbone of the side lying parallel to and in full length contact with the rail. This rail is corrugated in vertical cross section as shown in FIG. 4 to reduce fractional drag on the sides RS as they move through the machine. The ribs 45 of the pork side RS (shown in FIGS. 5 and 13) are uppermost and are transverse to the direction of travel of the infeed conveyor 27 and the pork side conveyor 26.

The pork side RS is moved toward the cutting and sawing section of the machine, which will later be described, by the pork side conveyor 26. The side RS is held down and pulled toward a cutter arm 30 (which carries a loin scribe saw 40 and a loin pull knife 42) by stud ponts 32 mounted on a gripper chain 34. The speed of the pork side conveyor 26 and the gripper chain 34 are synchronized, and a gripper chain rider arm 36 is inclined downwardly in the direction of travel to better hold the side RS in a firm position against conveyor lugs 38 (see FIGS. 3, 4, 7 and 11) as it reaches and passes through the loin scribe saw 40 and the loin pull knife 42 (see FIGS. 7, 9, 11 and 13).

Figure 5:
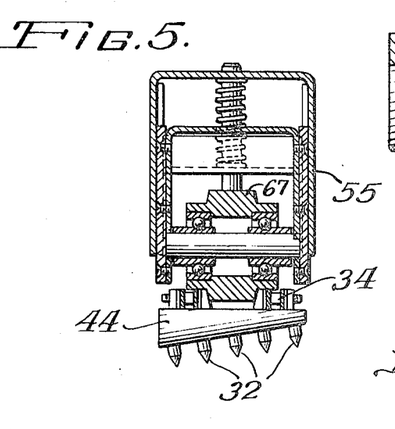
FIG. 5 is a vertical sectional view on the line 5—5 of FIG. 3.
Figure 6:
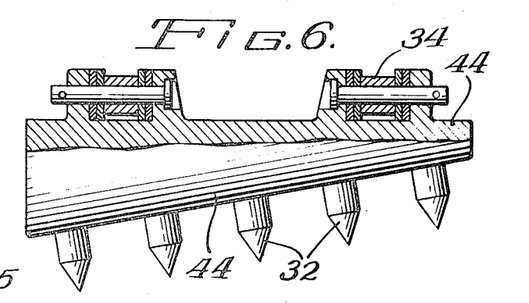
FIG. 6 is an enlargement of a transversely mounted tapered lug shown in FIGS. 4 and 5.

The gripper chain 34 contains transversely mounted lugs 44 with five of the pointed studs 32 mounted on each lug. The lugs 44 are tapered as shown in FIGS. 4, 5 and 6 in order to better conform to the contour of the back bone of the side RS which is pulled by them through the loin scribe saw 40 and the loin pull knife 42. The rider arm 36 is forced down against the center of the side RS by its own weight as well as by an adjustable pneumatic cylinder C1 acting as an air spring. Adjustment is accomplished by supplying compressed air to the cylinder through an adjustable pressure regulator PR1 as shown diagrammatically in FIG. 24. This action helps to position and hold the side RS for better sawing and cutting action.

At the outgoing end of the gripper chain 34 there is a loin depressor foot 48 (FIGS. 1 and 3) carried by a frame 55 for the gripper chain, which forces the side RS off the gripper chain 34 and down against the pork side conveyor 26, and also holds the side RS in position for sawing and cutting.

Figure 3:
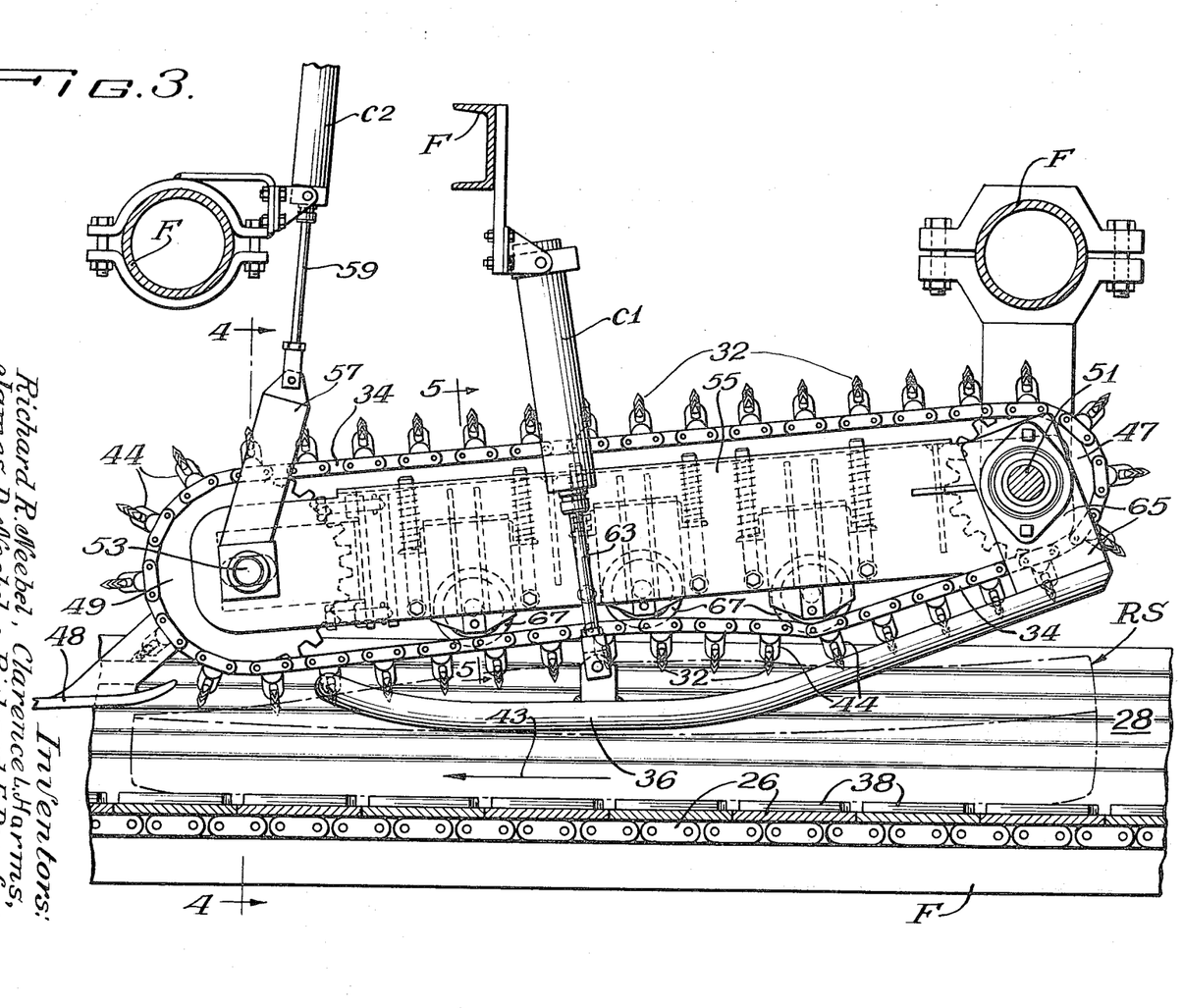
FIG. 3 is an enlargement of a portion of FIG. 2 showing mechanism for initially advancing a pork side into the machine.
Figures 23, 24:
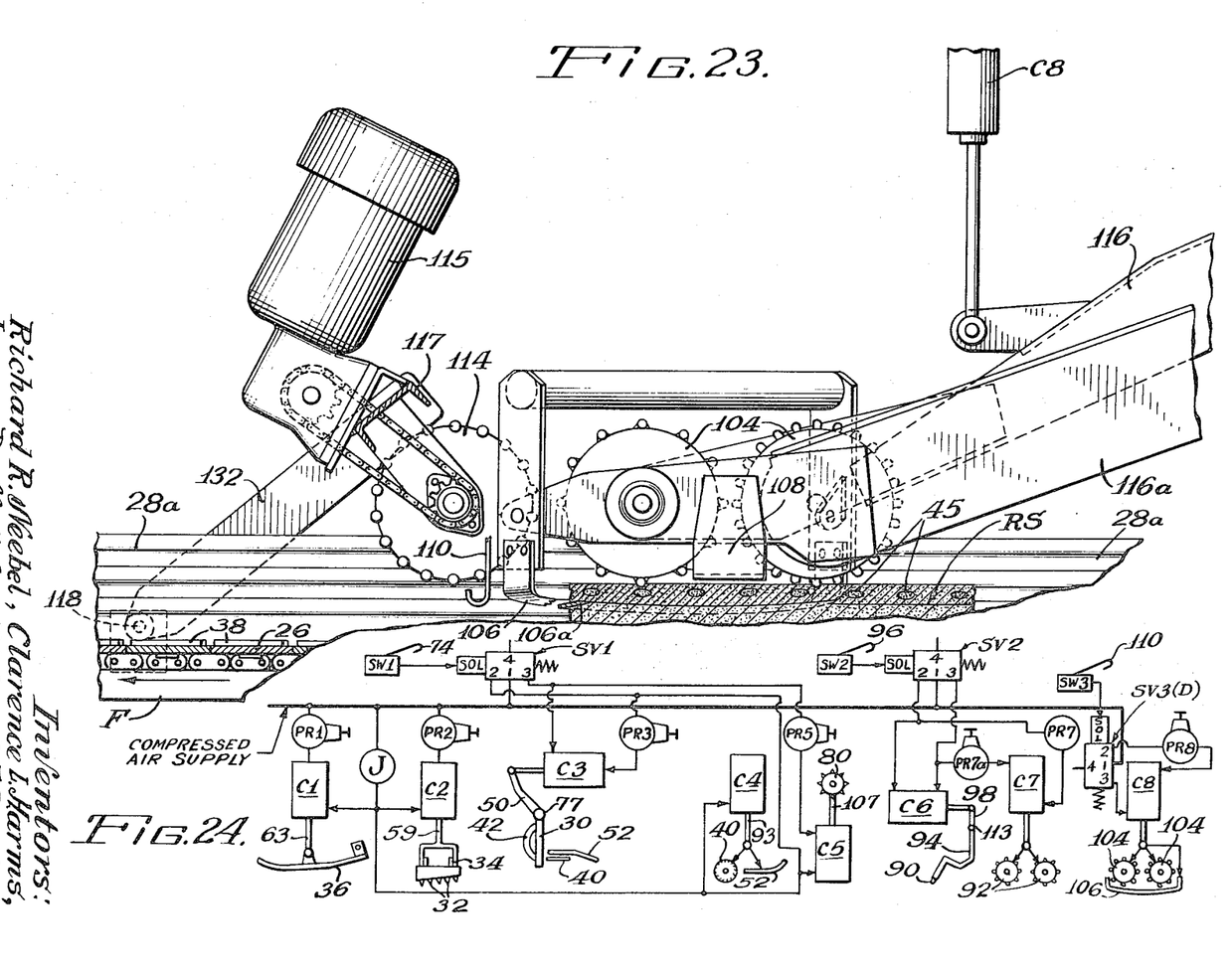
FIG. 23 is an enlarged elevation of the portion of FIG. 2 above the bracket 23 thereof.
FIG. 24 is a diagrammatic view of eight air cylinders and the controls therefor used in our machine.

The gripper chain 34 as shown in FIGS. 3 and 4 is of dual character and is trained around a pair of dual sprockets 47 and 49, shafts 51 and 53 being provided therefor. The frame 55 is associated with the gripper chain, its sprockets and shafts, and is pivoted about the axis of the shaft 51. The left hand end of the frame 55 is supported by a yoke 57, a piston rod 59 and a pneumatic cylinder C2. The cylinder C2 also acts as an air spring, a pressure regulator PR2 being provided therefor as shown in FIG. 24. The rider arm 36 is supported by a piston rod 63 and the pneumatic cylinder C1, the right hand end of the arm being mounted on a bracket 65 pivoted about the axis of the shaft 51. The frame 55 is provided with three spring biased hold-down rollers 67 (see FIG. 5) so as to variably conform the successive stud points 32 to the side RS as it passes under them as shown by dot-and-dash lines in FIGS. 3 and 4.

For rotating the shaft 51 and thereby actuating the gripper chain 34 a drive chain 69 shown in FIG. 1 is driven from a cross shaft 71 which is the output shaft from a speed reducer 73 driven by an electric motor 75. Between the chain 69 and the shaft 51 a safety slip clutch 25 is preferably provided for protection of the drive mechanism for the loin pull and rib cut operations. The shaft 71 extends transversely of the machine to drive the left side mechanism in synchronism with the right side mechanism, and the speed reducers 33 and 73 are adjusted for obtaining the same surface speed for the gripper chain 34 as for the conveyors 26 and 27.

An interval of at least 24" is allowed between successive sides RS on the conveyors 26 and 27 as shown in FIG. 1 in order that the cutter arm 30 shown and the loin scribe saw 40 shown in FIGS. 7, 9, 11 and 12 can be returned to their starting position by the automatic action of mechanical linkage including a lever 50 secured to the cutter arm 30 and actuated by a hydraulic cylinder C3 acting as an air spring through the action of a pressure regulator PR3 shown in FIG. 24. The entire assembly is pivotally mounted by securing the arm 30 to a vertical shaft 77 shown in FIGS. 7, 9 and 11, the shaft 77 being journalled in a bracket 79 secured to a secondary carriage member 76, as shown in FIG. 7A, the carriage member 76 has a pair of rods 81 which are freely and vertically slidable in a primary carriage member 83. The carriage member 83 is freely and horizontally slidable on a pair of rods 85 carried by the frame F of the machine.

Figures 7, 7A, 8:
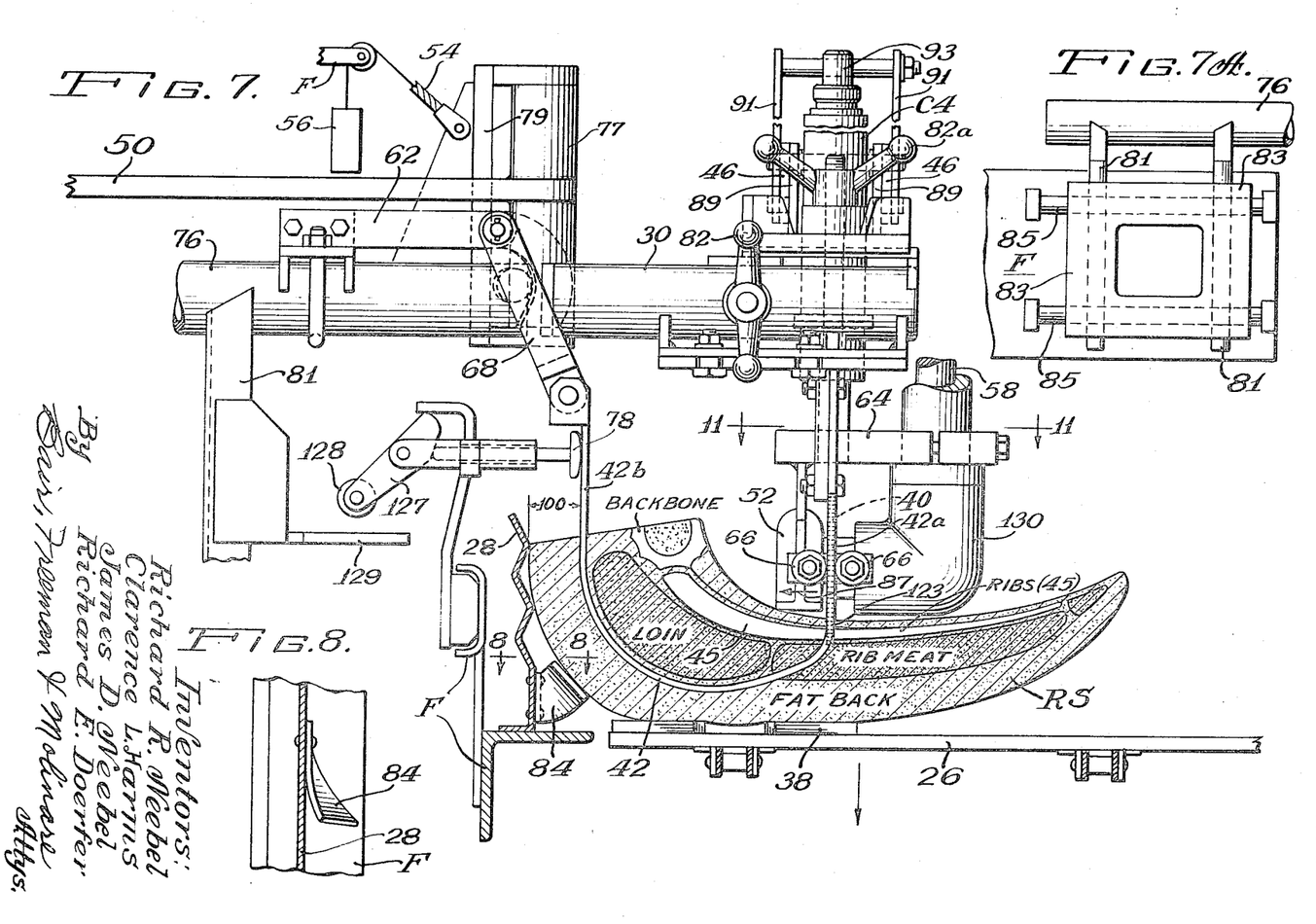
FIG. 7 is an enlarged vertical sectional view on the lines 7—7 of FIGS. 1 and 2.
FIG. 7A is a diagrammatic view representing a continuation of the left hand end of FIG. 7 and showing an arrangement for permitting both vertical and horizontal movements of a secondary carriage member.
FIG. 8 is a detail sectional view on the line 8—8 of FIG. 7.
Figures 9, 10:
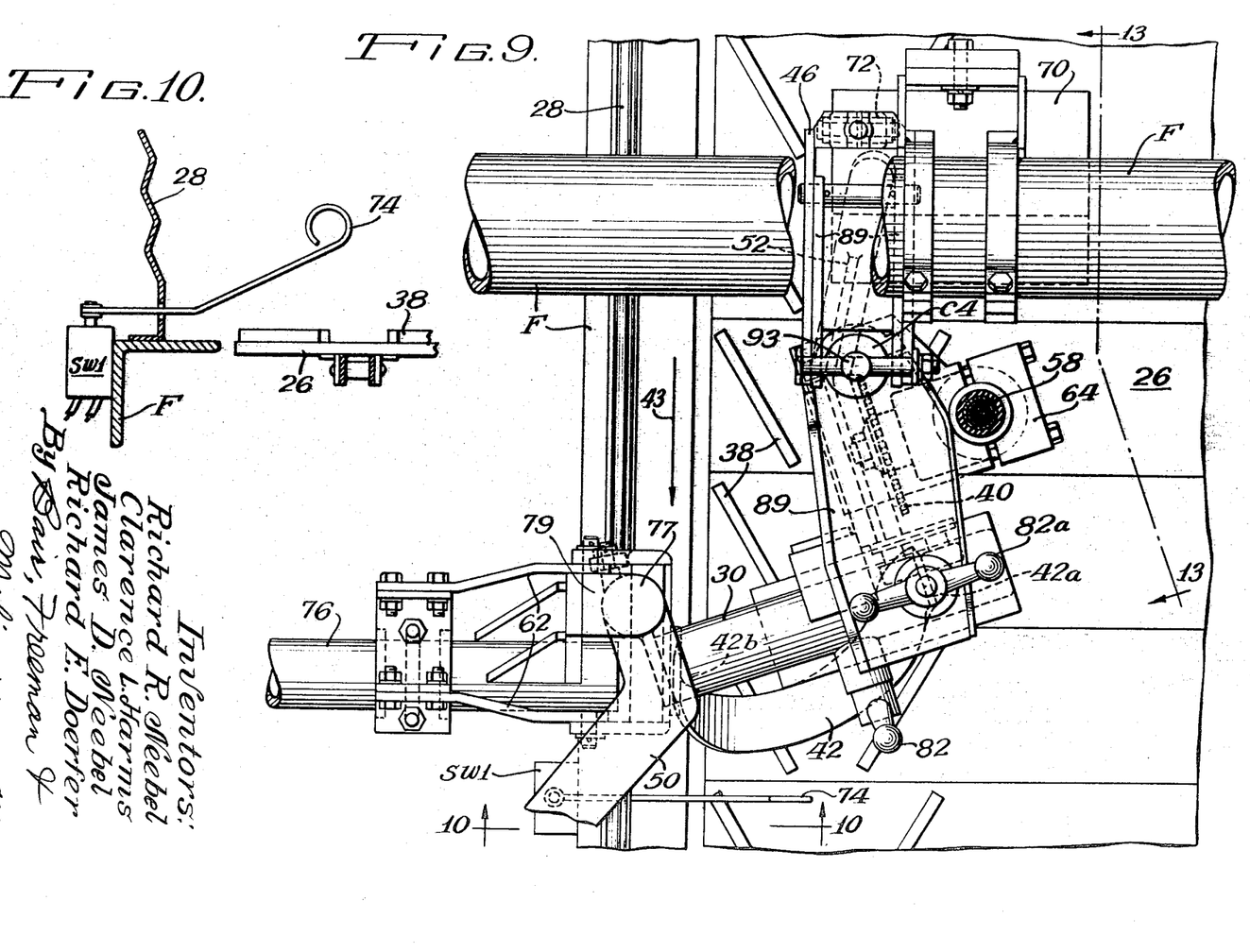
FIG. 9 is a plan view of the parts of our machine shown in FIG. 7 and shows a loin scribe saw, a scribe saw shoe and a loin pull knife in an initial position during the operation of the machine.
FIG. 10 is a vertical sectional view on the line 10—10 of FIG. 11 showing a pork side operated switch.
Figures 11, 12:
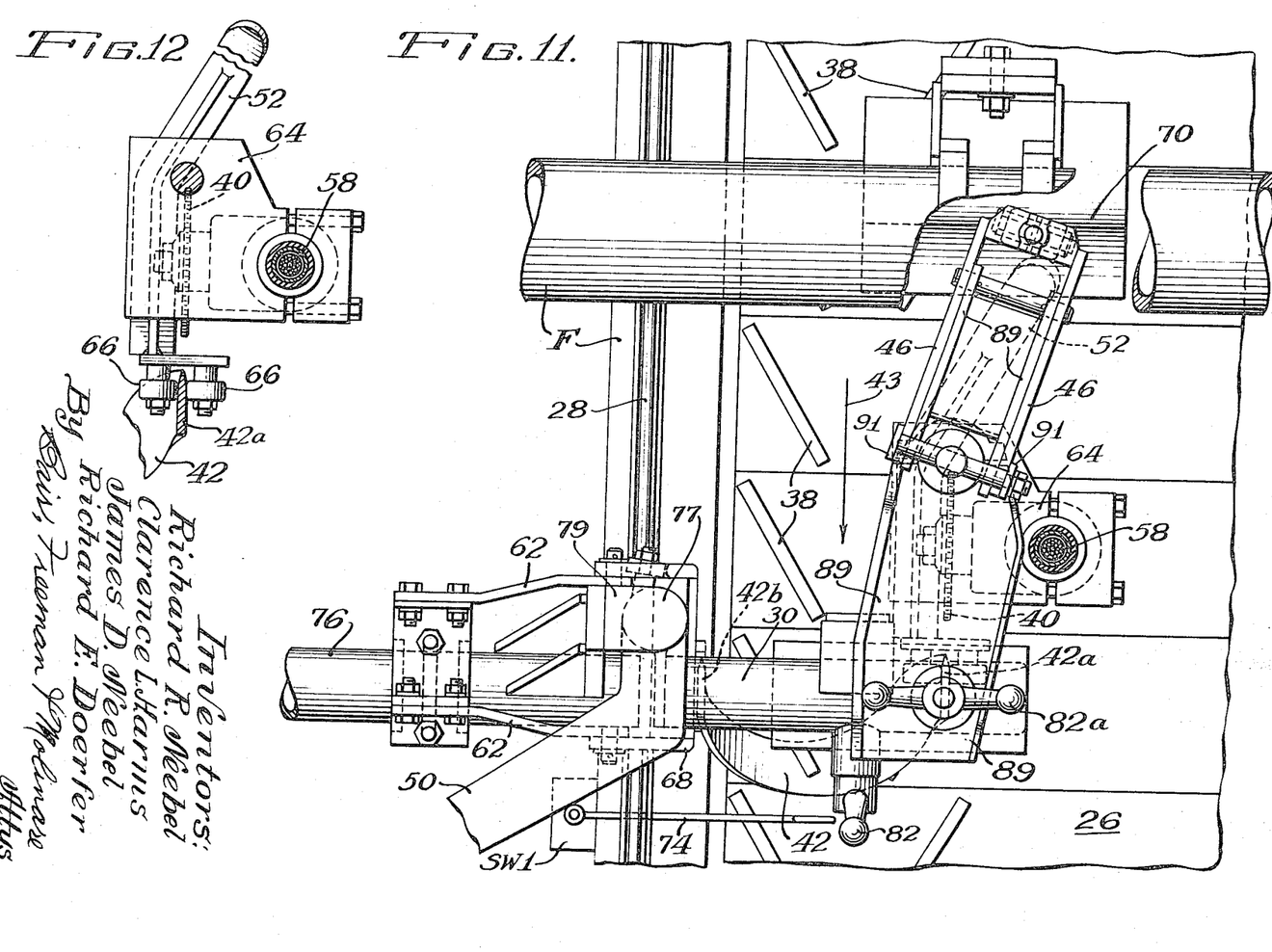
FIG. 11 is a view similar to FIG. 9 showing the saw, shoe and knife in a different position during a further operation of the machine.
FIG. 12 is a view similar to a portion of FIG. 11, and as taken on the line 11—11 of FIG. 7 to show more clearly the relation of details of the saw, shoe and knife.

FIGS. 11 and 12 show a normal position for the saw 40 parallel to the travel of the pork side conveyor 26, and FIG. 9 shows an angularly disposed position relative thereto for purposes which will hereinafter appear. The cutter arm 30 also carries a scribe saw shoe 52 (FIGS. 7 and 12) which functionally positions both the loin scribe saw 40 and the loin pull knife 42 for their initial cuts. The shoe 52 is held down by the weight of the cutter arm 30 and the elements 76 and 81 shown in FIG. 7A, and is pulled horizontally by a cable 54 terminating in a counterweight 56 shown diagrammatically in FIG. 7. The angle of the cable 54 is such that vertical as well as a horizontal pull is obtained, the vertical pull involving the rods 81 sliding in the primary carriage member 83 and counteracting to some extent the weight of the arm 30, etc. as above referred to, and the horizontal pull involving the member 83 sliding on the rods 85. Thus, the dual purpose of the counterweight 56 is to off-set the weight of the cutter arm 30, etc. for easier maneuverability and to pull the scribe saw shoe 52 against the up-curved portion of the ribs 45 of the side RS according to the arrow 87 in FIG 7. FIG. 7 also has legends as to parts of the side RS to clarify reference to the operations on the side hereinafter referred to.

During initial contact of the saw blade 40 with the side RS, it is diagonal (FIG. 9) to the line of conveyor 26 travel and the horizontal direction of its cut is determined by the position of the scribe saw shoe 52 at it rests on the side and follows the contour of the back bone of the side. The vertical level of the saw cut is determined by the elevation of the scribe saw shoe 52 throughout the entire travel of the side RS thereunder. The scribe saw 40 is a circular saw blade driven by an angle head drive 130 and a flexible power cable 58 (see FIGS. 1 and 13) from a motor 60 centrally mounted above the work area on an upper portion of the frame F. A scribe saw arm 64 which carries the shoe 52 and the saw 40 are horizontally stabilized by a pair of rollers 66 which ride up and down in a straddling position on the left hand (considered according to arrow 43) vertical side 42a of the loin pulling knife 42 as shown in FIGS. 7 and 12. The loin pull knife 42 is mounted on the cutting arm 30 but during part of the cutting cycle it is independently controlled as to direction and elevation of cut by mechanical linkage 68 (FIGS. 7, 9 and 11) pivoted to a bracket 62 mounted on the secondary carriage member 76. The loin pull knife 42 is positioned slightly behind the scribe saw 40 with the vertical portion 42a always following directly behind and in line with the scribe saw through the cut made through the rib bones 45 by the saw. In FIG. 9 it will be noted that the vertical portion 42b of the knife 42 is parallel to the arrow 43 but the portion 42a is diagonal (the initial contact mentioned at the beginning of this paragraph). During the last part of the loin cut operation shown in FIG. 11 both portions 42a and 42b are parallel to the arrow 43 as permitted by flexibility of the knife 42.

A unique feature of the vertical positioning mechanism for the loin pull knife 42 is a stationary cam track 70 (FIG. 13) and a roller 72 which serve to lift the knife 42 at the moment coinciding with the position of the side RS when the shoulder thereof has passed the knife. In this way the knife rises to follow the contour of the side RS and is then lowered to resume cutting the loin. The roller 72 is carried by dual arms 46 pivoted at 61 on a bracket 89 carried by the cutter arm 30, and is operatively connected by links 91 to the upper end of a piston rod 93 in a cylinder C4. The piston rod 93 acts normally as a supporting guide rod for the scribe saw 40 and the shoe 52 through the scribe saw arm 64. The cylinder C4 can be pneumatically actuated by the operation of a jam valve J (FIG. 24) for lifting the saw and shoe as will hereinafter appear.

Figure 13:
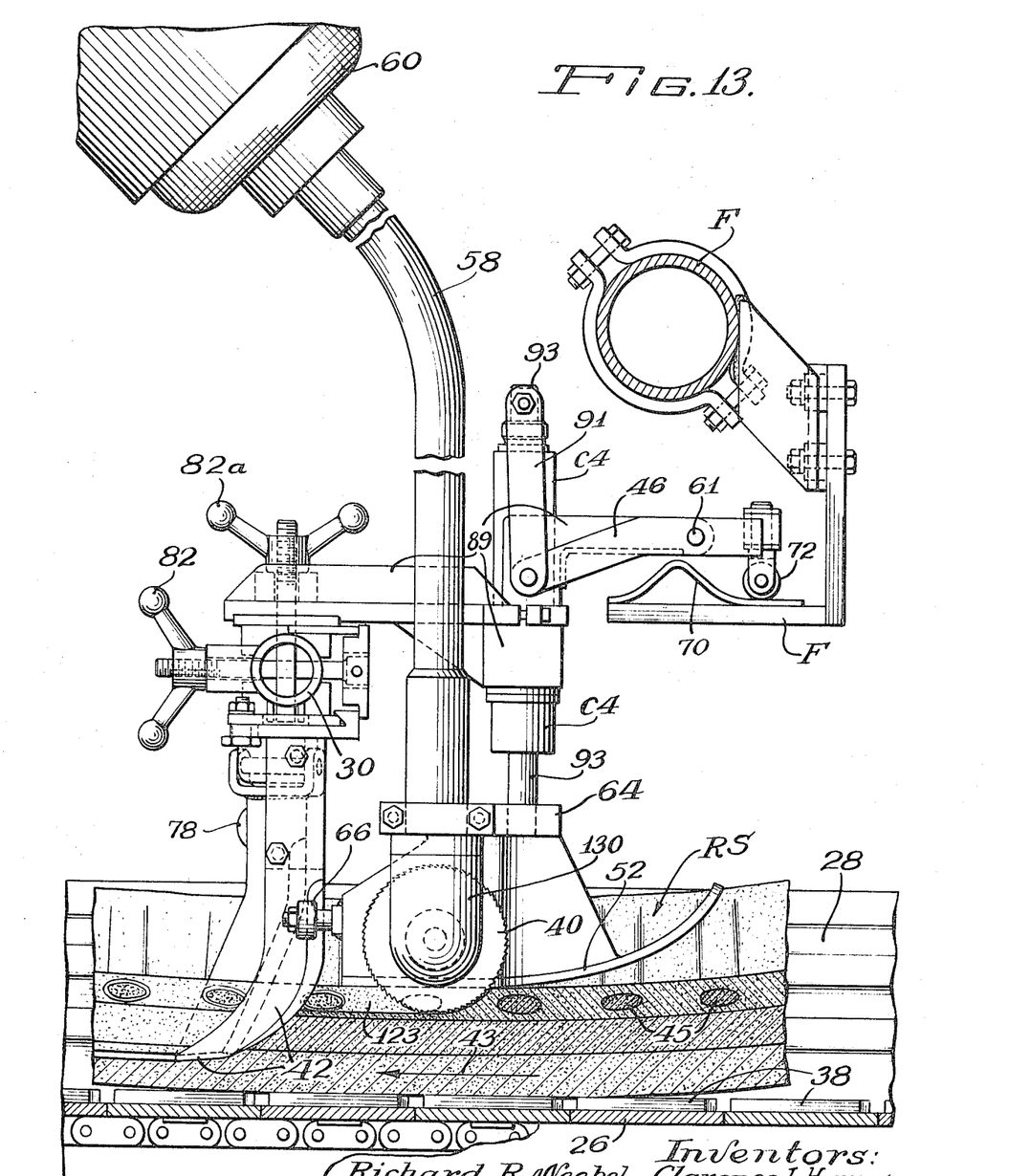
FIG. 13 is an enlarged side elevation of a portion of FIG. 2 above the bracket 13 thereof and as taken on the line 13—13 of FIG. 9.

The initial position (FIG. 9) of the loin knife 42 is determined by the vertical and horizontal position of the scribe saw shoe 52. However, as the side RS is moved further along by the pork side conveyor 26 it depresses a wire loop switch actuator 74 (FIGS. 9, 10 and 11) of a micro-switch SW1 which then activates the hydraulic cylinder C3 (see FIG. 24) which repositions the entire cutter arm and thereby the saw 40 and the knife 42 into another position shown in FIG. 11 by the switch opening a solenoid valve SV1. FIGS. 7 and 13 also show the parts in this other position.

The solenoid valve SV1 is a double acting type with spring return, supply inlet 1, normal outlet 2, operated outlet 3 and exhaust 4. Solenoid valves SV2 and SV3 referred to later, are the same type. The cylinder C3 is also under control of the switch SM1 and the solenoid valve SV1 (see FIG. 24).

In changing from the initial position of FIG. 9 to this other position shown in FIG. 11, the roller 72 passes over the hump of the cam track 70 as further explained hereinbefore. Thus, a momentary lifting of the loin pull knife 42 is effected and it is then returned to its previous elevation but in its new direction of cutting action shown in FIG. 11. This is necessary in order to follow the natural contour of the side RS at that point. The saw and knife are now in a position to continue cutting down the length of the side RS in the direction of the conveyor 26 instead of diagonally. This change in cutting direction is necessary due to the fact that the loin (shaded area on the sides RS in FIG. 1) is broader at the lead end than it is shortly thereafter. The result is, first a curved saw cut path, and then a straight saw cut path down the length of the side RS.

Also when the cutter arm 30 is moved into this final position of FIG. 11, the vertical portion 42b of the loin pull knife 42 contacts a stop button 78 as in FIG. 7 to close the loin knife (spring its sides closer together) so it will cut a narrower horizontal portion of the loin from the side RS as shown. The knife will be found more open in FIG. 9. Such closing of the knife is possible because of its flexible character and is permitted by the mechanical linkage 68. During this time the knife 42 is also positioned closer to the side rail 28.

The stop button 78 is automatically adjusted by means of a cam lever 127 shown in FIG. 7 pivoted to the frame F and carrying a cam roller 128. One of the rods 81 as shown in FIG. 7 has a roller engaging arm 129 which at times engages the roller 128. The stop button 78 controls the amount of fat left on the loin. This is accomplished by the variation in elevation of the scribe saw shoe 52 which rides on the rib section. As the scribe saw shoe 52 changes elevation the cutter arm 30 also changes elevation. This in turn actuates the stop button 78 to control the horizontal location of the knife, thus controlling the fat thickness left on the loin after cutting. Normally the heavier or thicker the side RS is, the thicker the fat back. Thus, distance 100 increases on heavier sides to adjust for the thicker fat backs.

Figures 14, 15, 16, 17:
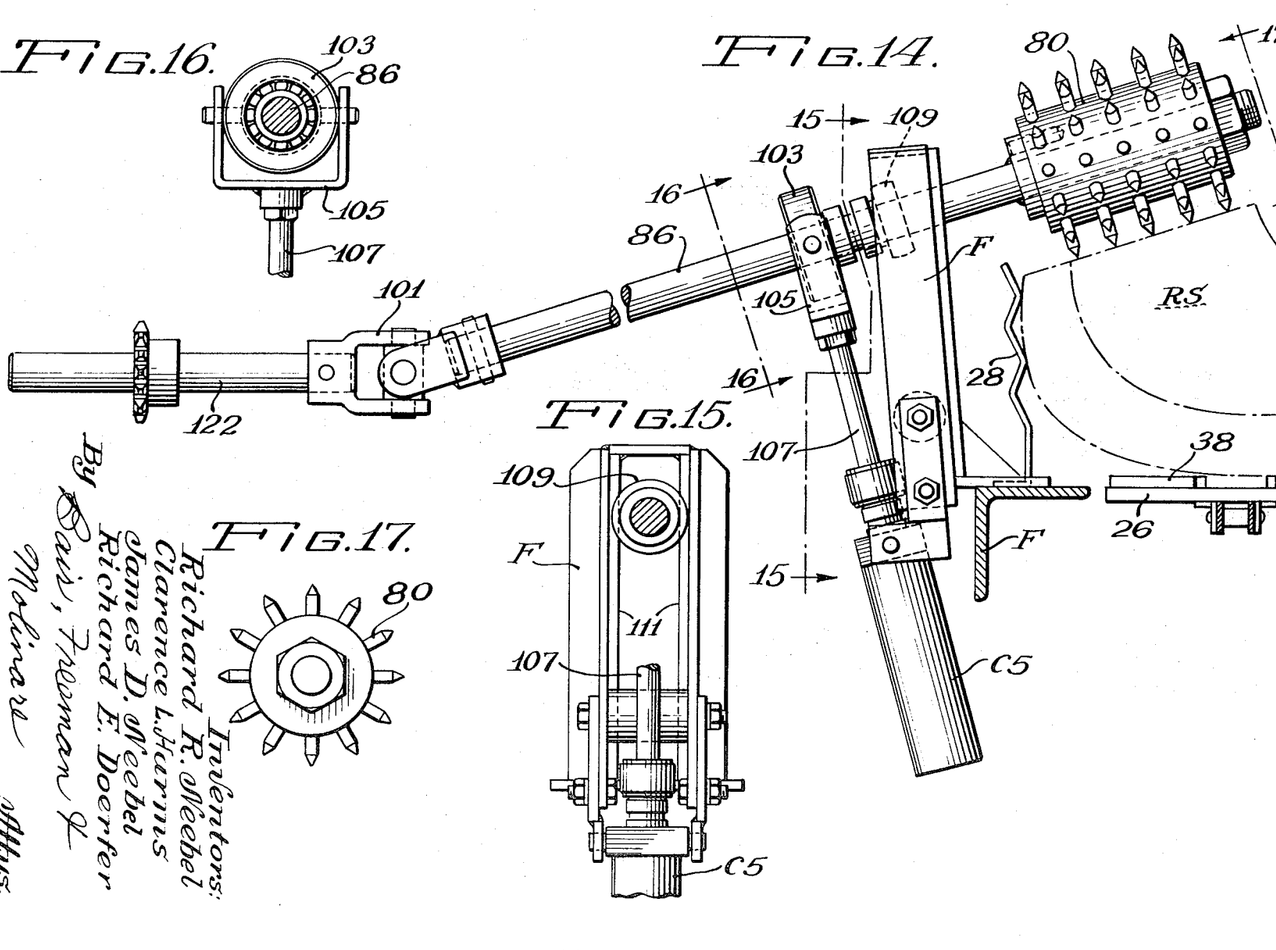
FIG. 14 is an enlarged elevation of a portion of FIG. 2 as taken on the line 14—14 thereof.
FIG. 15 is a sectional view taken on the line 15—15 of FIG. 14.
FIG. 16 is a sectional view taken on the line 16—16 of FIG. 14.
FIG. 17 is an end view of a drive drum shown in FIG. 14 and as viewed at the line 17—17 thereof.

When the side RS has tripped the switch wire 74 to close the switch SW1, a loin drive-drum 80 (FIGS. 14 and 17) is automatically forced down on the already cut portion of the loin which is still lying on top of the remainder of the side RS in order to help pull the entire side through the loin cutting and sawing operation and on to the next station of the machine. This is accomplished through a pressure regulator PR5 by a cylinder C5 also actuated by the switch SW1 and the solenoid valve SV1 as illustrated diagrammatically in FIG. 24. The cylinder C5 normally keeps the dum 80 raised by flow of compressed air from outlet 2 of the valve SV1.

Two sizes of loin knives 42 may be used on our machine depending on whether regular or heavy sides RS are being processed. With respect to these pork sides, regular sides are 24 to 30 inches long and heavy sides are 30 to 40 inches long as a general rule. A heavier and wider knife is used for heavy sides and requires an adjustment along the arm 30 which holds the scribe saw 40 in order to cut a wider loin portion. A wing nut 82a is provided for this purpose (FIGS. 7, 9, 11 and 13). The knives 42 themselves are secured to the cutter arm 30 for quick exchange by a wing nut 82.

Preceding the wire loop switch actuator 74 and extending from the lower edge of the corrugated side rail 28 is a deflector bar 84 (FIGS. 7 and 8) which forces the fatback of the side RS up against the loin knife 42, thus giving a maximum sized cut of loin by preventing the fatback from packing down into the adjacent corner between the frame F and the rail 28.

After the side RS has passed by the wire loop switch actuator 74 and the actuator has returned to its normal position, the cylinder C3 which controls the two positions (FIG. 9 and 11) of the saw 40 and the knife 42 automatically returns the saw and knife to their respective starting positions of FIG. 9 through the action of the switch SW1 and the solenoid valve SV1 and at the same time the loin drive-drum 80 is raised through the action of the same switch and valve shown in FIG. 24.

In an emergency the machine operator can raise (and later lower) the gripper chain rider arm 36 (C1), the gripper chain 34 (C2), the saw 40 and shoe 52 (C4) and the drum 80 (C5) pneumatically by closing (and later opening) the jam valve J as evident in FIG. 24.

The drive drum 80 as shown in FIGS. 1, 2 and 14 to 16 inclusive is mounted on a shaft 86 connected by universal joint 101 with a shaft 122 which is journalled in the frame F. The shaft 122 is driven by a chain 121 as shown in FIG. 1 from a counter shaft 97 which in turn is driven by a chain 99 from the shaft 51. A bearing 103 is supported by a yoke 105 and a piston rod 107 of the cylinder C5, and the shaft 86 is guided by a bearing 109 thereof movable in a slot 111 of a portion of the frame F of the machine.

Figures 18, 19, 20:
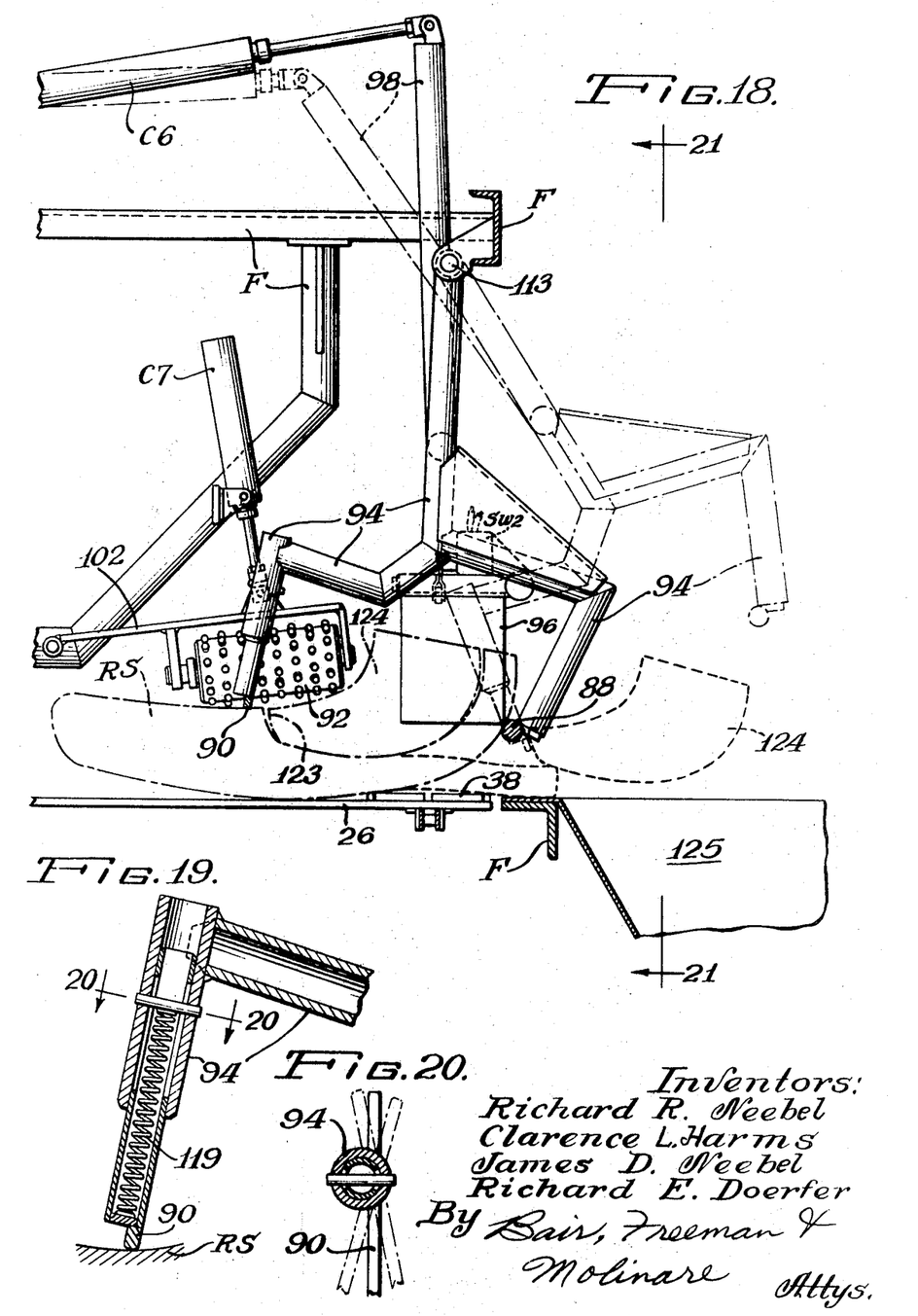
FIG. 18 is an enlarged elevation of a portion of our machine adjacent the line 18—18 of FIG. 2.
FIG. 19 is an enlarged sectional view of a portion of FIG. 18 found in the lower left quadrant thereof.
FIG. 20 is a detail sectional view on the line 20—20 of FIG. 19.

After the loin has been pulled, the side RS (now in two pieces) proceeds with the pork side conveyor 26 toward the next (loin push-off) operation. As the corrugated side rail 28 ends, the back bone side of the side RS is held in position by a horizontal guide rail bar 88 (FIGS. 18 and 21) located in line with the railing 28 and above the conveyor 26. This guide rail bar is movable, pivoting outward from an axis 113 the same as a pair of spring loaded kick off shoes 90. FIG. 19 shows a spring 119 to effect such loading.

Figure 21:
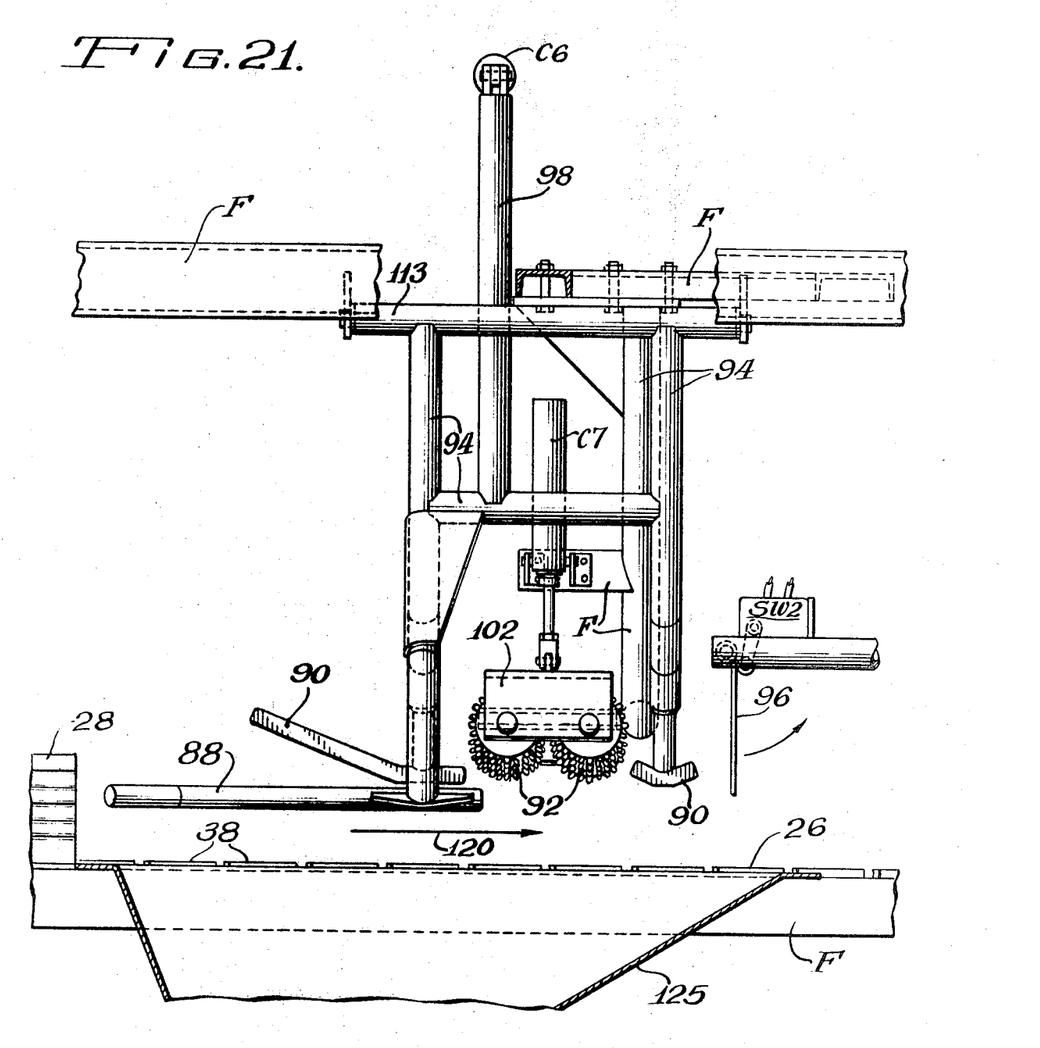
FIG. 21 is an enlarged elevation of a portion of FIG. 2 above the bracket 21 and shows the parts in reverse to better illustrate details thereof.
Figure 22:
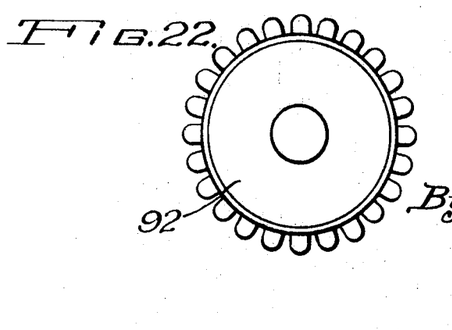
FIG. 22 is an enlarged end view of a roller illustrated in FIG. 21.

The kick off shoes 90 are inclined upwardly at their lead ends (see FIG. 21 wherein the view is from the side of the machine opposite that shown in FIGS. 1, 2, 3 and 13 so travel is opposite as indicated by an arrow 120 in FIG. 13) so that they may ride up on the side RS as it proceeds down the conveyor 26. The shoes 90 are located on either side of a pair of freely rotating knob covered drums 92 as shown in FIG. 21. The kick off shoes 90 are slidably supported in a welded tube assembly 94 and the pair of shoes and the guide rail bar 88 move together as a unit about the axis as shown by solid and dot-and-dash lines in FIG. 18. Also the shoes 90 have limited oscillation possibilities as illustrated in FIG. 20 to allow them to align themselves for the purpose of dropping into the scribe saw cut at 123 (FIG. 7 and 13).

When the side RS actuates a trip arm 96 shown in FIG. 21, an actuating arm 98 forming part of the assembly 94 is pivoted from the full line position in FIG. 18 to the dot-and-dash line position thereof by a cylinder C6 so that the kick off shoes 90 will drag transversely across the side RS, drop into the saw cut at 123 and push the pulled lion 124 off the side of the conveyor 26 and onto a chute 125 where it falls into a loin cart or onto a loin conveyor 131 or the like. The trip arm 96 closes a switch SW2 which through a solenoid valve SV2 as shown in FIG. 24 controls the flow of compressed air to the cylinder C6 for moving the actuating arm 98 from the full line position to the dot-and-dash line position of FIG. 18. At the same time the switch SW2 effects lowering of the knob covered drums 92 (controlled by a pressure regulator PR7a) which are normally in the raised position through the action of a cylinder C7 and a pressure regulator PR7 (see FIGS. 18, 21 and 24).

Slightly preceeding the above operation and in order to hold the side RS in position during the loin push-off operation, the pair of transversely mounted knob covered drums 92 drop onto the remaining rib section of the side RS under the pressure of the pneumatic cylinder C7. The two drums 92 are supported on a side mounted frame 102 which pivots up and down. This holding operation is thus also triggered by the trip arm 96 of the switch SW2. The knob covered drums 92 are raised automatically after the side RS has passed by and allowed the trip arm 96 to resume its normal vertical position shown in FIG. 21.

RIB CUT OPERATION

Figure 25:
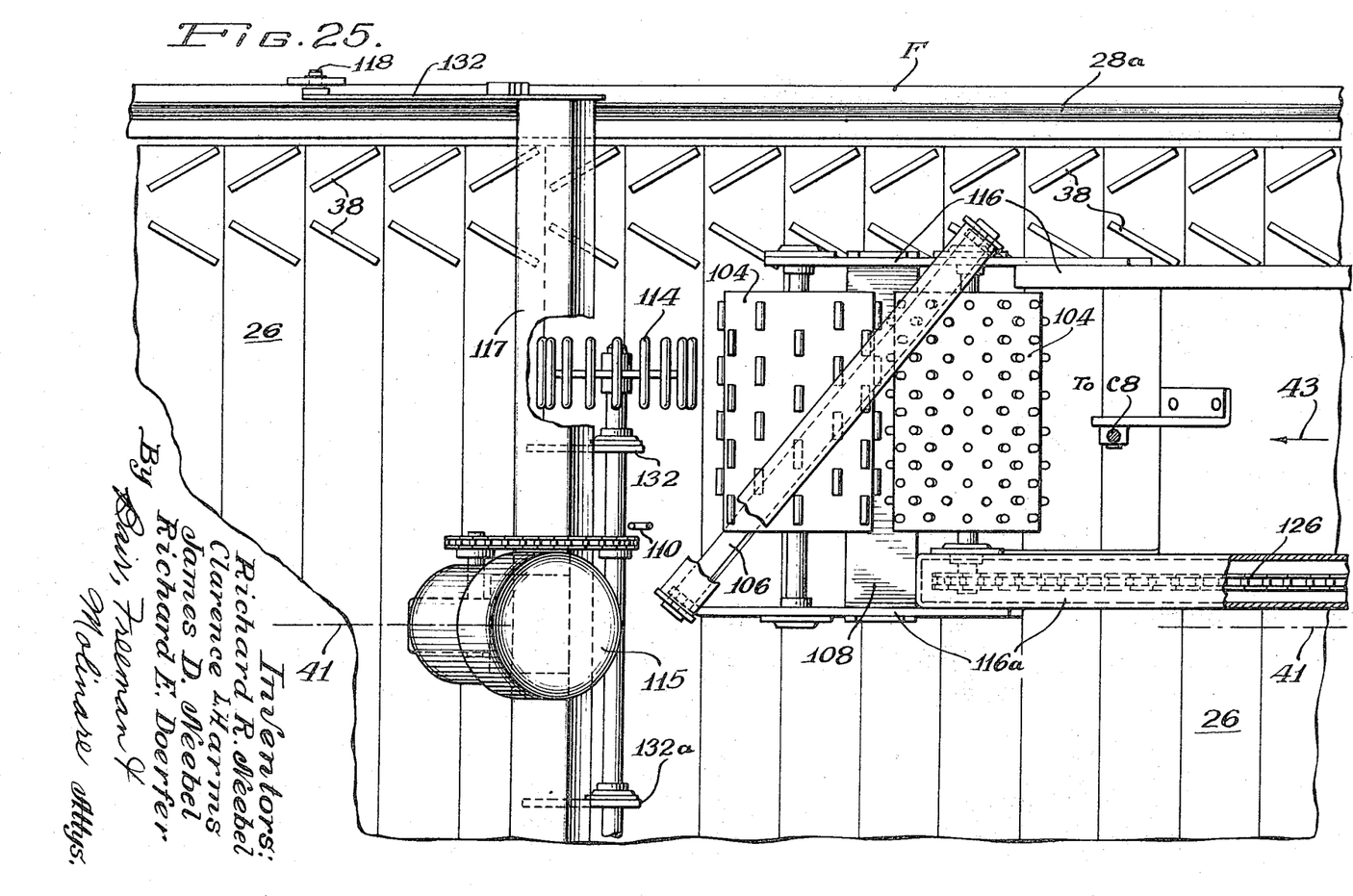
FIG. 25 is a plan view of the portion of the machine shown in FIG. 23.

After the loin has been removed, the remaining portion of the side RS proceeds down the conveyor 26 and is contacted by the first of two knobbed drive drums 104 (larger than the first pair of drums 92) powered to propel the side RS through a rib cutting knife 106 (see FIGS. 23 and 25) at a speed synchronized with the conveyor drive. Such synchronized drive is attained by a chain 126 from the shaft 97 as shown in FIGS. 1 and 2. This portion of the conveyor has a side rail 28a similar to the side rail 28. The rib cutting knife 106 is arranged diagonally to the direction of conveyor travel as shown in FIGS. 1 and 25 for two reasons;

(1) By entering the side RS at one corner rather than along the entire leading edge of the knife, the meat is more easily drawn past the knife.

(2) The ends of the ribs are diagonal to the side RS itself and thus when the knife 106 is elevated to withdraw it from the side RS it leaves the meat on a diagonal line corresponding to the ends of the ribs.

The rib knife 106 is sharpened with the bevel on the upper side and is mounted with the leading edge of the knife higher than the trailing edge in respect to the pork side conveyor 26 as shown in section at 106a in FIG. 23. This arrangement provides an angle of attack which forces the knife up in a plowing effect which forces it to cut close to the bottom of the ribs 45. A hold down plate 108 is mounted at the bottom of and between the two drive drums 104. Its purpose is to prevent the side RS from sticking to the first drive drum and to force the side RS against the lugs 38 of the conveyor 26. The rib cutting knife 106 is automatically positioned vertically by the thickness of the side RS and it cuts immediately under the ribs. The angle at which the rib cutting knife 106 is set and the angle at which the edge is sharpened as above described satisfies a requirement that the knife cut as close to the under side of the ribs as possible. This knife is designed with a curvature throughout its length which corresponds to the natural curvature of the ribs and thus provides most effective cutting.

When the leading edge of the side RS strikes an actuator wire 110 located downstream of the second drive drum 104 (see FIGS. 23 and 25), there is a delayed action pneumatic force supplied to a pair of arms 116 and 116a on which the drive drums 104, hold down plate 108 and rib cutting knife 106 are mounted by a pneumatic cylinder C8 (normally under control of a pressure regulator valve PR8), lifting the arm 116–116a upward and pulling the knife 106 free from the meat. This withdrawal of the knife 106 is so timed as to cut off the ribs on a line corresponding to the upstream ends thereof. Part of the arm 116a serves as a housing for the chain 126.

The delayed action referred to may be had by the arrangement shown diagrammatically in FIG. 24, a switch SW3 being actuated by the wire 110 and in turn energizing a solenoid valve SV3(D), the "D" indicating a delayed action type of valve.

Since the knife 106 is the lowest member attached to the arm 116–116a, the side RS (FIGS. 23 and 25) is no longer propelled by the pair of drive drums 104. Therefore, an independently mounted drive wheel 114 continues to pull the side RS down the conveyor and free of the rib cutting knife 106. The drive wheel 114 and its drive motor 115 are mounted in a separate pair of arms 132 and 132a which are free to move up and down, loosely pivoting on pivot pins 118 at opposite sides or the right and left sides of the machine. The two arms 132 and 132a, and a cross member 117, form a frame for mountnig the wheel 114 for the side RS, a simliar wheel (not shown) for the other pork side (also not shown) and its motor 115. The loose pivoting referred to allows either of the drive wheels 114 (the right hand one shown) or the left hand one (not shown) to independently seek their own elevation as dictated by the right and left pork sides respectively.

An operator at the discharge end of the machine can lift the ribs from the remaining portion of the side RS and place them in a separate container, conveyor or the like, thus completing the rib cutting operation.

With further reference to FIG. 24, only the essential operation of the pneumatic circuit is disclosed. Solenoid valves are indicated as actuated by switches without going into detail with respect to electric circuits therefore. Since circuitry of this character is well known in the automatic machine art, we deem it unnecessary to illustrate the same in detail. FIG. 24 also serves as a summary of the machine as all operations are shown in sequence, cylinders C1 and C2 representing a preliminary feed station, cylinders C3 and C4 a loin pull station, cylinder C5 an intermediate feed station, cylinder C6 a push-off station, cylinder C7 a second intermediate feed station, and cylinder C8 a rib cut station. Beyond the rib cut station, the independent motor driven wheel 114 of FIG. 23 constitutes a final feed station.

From the foregoing specification it will be obvious that we have provided a loin pull and rib cut machine which greatly reduces the normal work and hand labor of loin pulling and rib cutting operations, thus reducing the labor force. At the same time the quality of the loin pulled and the ribs cut are maximum and labor costs are reduced because of reducing the amount of subsequent hand trimming of fat from the loins and ribs. The operations by our machine are performed in such manner that the parts thereof are automatically adjusted for each cutting operation to the individual size and shape of each side RS. While these operations are being performed by the right side of the machine, the left side is simultaneously performing the same operations on left sides in an obvious manner, and the only attention required by operators is one to feed the right and left sides onto the infeed conveyor 27 and another to remove the ribs and rib meat from the fat backs which are discharged off the pork side conveyor 26 (upper left hand end in FIG. 1).

We claim as our invention:

1. In a loin pull and rib cut machine, conveyor means operable to convey pork sides through said machine, said machine having a loin pull station, a loin push-off station and a rib cut station, loin pull mechanism at said loin pull station comprising a scribe saw and a U-shaped loin pull knife, said scribe saw being positioned with respect to said conveyor means to scribe the ribs of the pork side adjacent one edge of the loin, said loin pull knife having a portion immediately following said scribe saw and a portion to cut under the loin, means for causing said scribe saw and said portion immediately following it to follow the shape of the loin comprising a shoe carried by said scribe saw and adapted to follow the contour of the back bone of the pork side, means to bias said shoe toward the back bone, means at said push-off station to push the cut loin from the pork side, and means at said rib cut station to cut the ribs from the pork side.

2. A loin pull and rib cut machine according to claim 1 wherein said means for causing said scribe saw and said portion of said loin pull knife immediately following said scribe saw to follow the shape of the loin comprises a fluid pressure cylinder normally operable to position said scribe at a diagonal to the line of travel of said conveyor means, and means responsive to the pork side when it arrives at a predetermined position on said conveyor means to operate said cylinder to position said scribe saw substantially parallel to the line of travel of said conveyor means.

3. A loin pull and rib cut machine according to claim 2 including means operable to lift said loin pull knife, said lift means comprising a roller coacting with a cam as a result of said cylinder responding to said means responsive to the pork side when it arrives at a predetermined position on said conveyor means.

4. A loin pull and rib cut machine according to claim 1 wherein additional conveyor means are provided for positively advancing the pork side before it reaches said loin pull station and comprises a gripper conveyor having gripper lugs biased to engage the back bone portion of the pork side.

5. A loin pull and rib cut machine according to claim 4 wherein means is provided between said loin pull station and said push-off station for feeding the pork side comprising a knobbed drive-drum, and means to bias said drum toward the pork side comprising fluid pressure operated means also responsive to the position of the pork side when it arrives at said predetermined position.

6. A loin pull and rib cut machine according to claim 4 wherein fluid pressure operated means is provided to operate said push-off means, and means responsive to the position of the pork side on said conveyor means after the loin has been pulled to actuate said fluid pressure operated means.

7. A loin pull and rib cut machine according to claim 4 wherein means is provided between said push-off station and said rib cut station to feed the pork side and comprises knobbed drums and means to bias said drums against the pork side.

8. A loin pull and rib cut machine according to claim 4 wherein said rib cut means comprises a rib cut knife and freely rotatable drive-drums to hold the pork side against said conveyor means under bias.

9. A loin pull and rib cut machine according to claim 4 wherein fluid pressure operated means is provided to operate said push-off means, said push-off means having spring extended shoes to enter the saw cut in the pork side and engage the adjacent edge of the loin to effect push-off thereof with respect to the remaining portion of the pork side, and means responsive to the position of the pork side on said conveyor means after the loin has been pulled to actuate said fluid pressure operated means.

10. A loin pull and rib cut machine according to claim 4 wherein said means to bias said gripper chain against the pork side comprises fluid pressure operated cylinder means and an adjustable pressure regulator for supplying fluid under pressure thereto.

11. A loin pull and rib cut machine according to claim 10 wherein said means to bias said shoe toward the back bone comprises a fluid pressure operated cylinder, and means responsive to the pork side when it arrives at a predetermined position to control said cylinder.

12. A loin pull and rib cut machine according to claim 11 wherein a fluid pressure operated means is connected with said scribe saw and said shoe for elevating them and a manually actuated jam valve is provided for actuating said cylinder.

13. A loin pull and rib cut machine according to claim 12 wherein said means for causing said scribe saw and said first portion of said loin knife to follow the shape of the loin comprises a fluid pressure cylinder normally operable to position said scribe saw at a diagonal to the line of travel of said conveyor means, means responsive to the pork side when it arrives at a predetermined position on said conveyor means to operate said cylinder to position said scribe saw substantially parallel to the line of travel of said conveyor means, wherein fluid pressure operated means is provided to operate said push-off means, and means responsive to the position of the pork side on said conveyor means after the loin has been pulled to actuate said fluid pressure means.

14. A loin pull and rib cut machine according to claim 12 wherein means are provided for actuating said jam valve so as to operate said fluid pressure operated cylinder means in the reverse direction.

15. A loin pull and rib cut machine according to claim 10 wherein a drive-drum is provided to feeding the pork side between said loin pull station and said push-off station, and a fluid pressure operated cylinder biases said drive-drum toward said conveyor means and is controlled by said means responsive to the pork side when it arrives at a predetermined position.

16. A loin pull and rib cut machine according to claim 4 wherein a rider arm is biased to engage the rib portion of the pork side and force it toward said conveyor means.

17. A loin pull and rib cut machine according to claim 4 wherein said lugs of said gripper conveyor are tapered and are provided with pork side engaging points and said conveyor means has lugs thereon opposite said gripper conveyor to prevent slippage of said conveyor means under the pork sides.

18. A loin pull and rib cut machine according to claim 12 wherein said jam valve also actuates said fluid pressure operated cylinder means to bias said gripper conveyor against the pork side in a contra-biasing direction.

19. A loin pull and rib cut machine according to claim 18 wherein a rider arm is biased to engage the rib portion of the pork side, and fluid pressure operated means is provided to effect such bias, said jam valve being also operable to actuate said last mentioned fluid pressure operated means in a contra-biasing direction.

20. A loin pull and rib cut machine according to claim 1 wherein means is provided between said loin pull station and said push-off station to bias the pork side against said conveyor means.

21. A loin pull and rib cut machine according to claim 20 wherein means is provided between said push-off station and said rib cut station to feed the pork side and comprises knobbed drums, and means to bias said drums against the pork side.

22. A loin pull and rib cut machine according to claim 20 wherein said rib cut means comprises a rib cut knife and freely rotatable drive-drums biased to hold the pork side against said conveyor means.

23. A loin pull and rib cut machine according to claim 20 wherein said means to bias the pork side against said conveyor means comprises a knobbed drive-drum and fluid pressure operated means normally biasing said drive-drum away from the pork side, and including means responsive to the pork side when it arrives at a predetermined position on said conveyor means and being also operable to actuate said fluid pressure operated means in a direction contra-normal to engage said drive-drum with the pork side.

24. A loin pull and rib cut machine according to claim 23 wherein a jam valve is provided to actuate said fluid pressure operated means normally biasing said drive-drum away from the pork side in said normally biased direction.

25. A loin pull and rib cut machine according to claim 20 wherein means is provided responsive to the pork side when it arrives at a predetermined position on said conveyor means to operate said means between said loin pull station and said push-off station to bias the pork side against said conveyor means.

26. A loin pull and rib cut machine according to claim 1 wherein fluid pressure operated means is provided to operate said push-off means, and means responsive to the position of the pork side on said conveyor means after the loin has been pulled to actuate said fluid pressure means.

27. A loin pull and rib cut machine according to claim 26 wherein means is provided between said push-off station and said rib cut station to feed the pork side and comprises knobbed drums, and means to bias said drums against the pork side.

28. A loin pull and rib cut machine according to claim 26 wherein said rib cut means comprises a rib cut knife and freely rotatable drive-drums to hold the pork side against said conveyor means under bias.

29. A loin pull and rib cut machine according to claim 1 wherein means is provided between said push-off station and said rib cut station to further feed the pork side and comprises a knobbed drum and means to bias said drum against the pork side.

30. A loin pull and rib cut machine according to claim 29 wherein said rib cut means comprises a rib cut knife and freely rotatable drive-drums to bias the pork side against said conveyor means.

31. A loin pull and rib cut machine according to claim 29 wherein said means to bias said drum comprises a fluid pressure operated cylinder acting as an air spring to force said drum downward against the pork side.

32. A loin pull and rib cut machine according to claim 31 wherein means is responsive to the position of the pork side on said conveyor means after the loin has been pulled to actuate said fluid pressure operated cylinder in the opposite direction.

33. A loin pull and rib cut machine according to claim 1 wherein said rib cut means comprises a rib cut knife and freely rotatable drums to bias the pork side against said conveyor means while it is drawn past said rib cut knife.

34. A loin pull and rib cut machine according to claim 33 including means to raise said drums and said rib cut knife out of the pork side at the end of the rib cut operation, said means to raise comprises a fluid pressure operated cylinder and delayed action actuating means therefor responsive to the arrival of the advance edge of the pork side past said rib cut knife.

35. A loin pull and rib cut machine according to claim 34 wherein means is provided after the ribs are cut from the pork side to further advance the pork side along the conveyor and aid in pulling it through said rib cut knife.

36. A loin pull and rib cut machine according to claim 1 wherein said scribe saw and said loin pull knife are mounted for substantially free vertical and horizontal movement, the weight thereof effecting operative engagement thereof with the pork side, and a counterweight to effect the bias of said shoe toward the back bone of the pork side.

37. A loin pull and rib cut machine according to claim 1 wherein said scribe saw and said loin pull knife are mounted for substantially free vertical and horizontal movement, said loin pull knife is adjustable in width, and means is responsive to the size of the pork side to move said loin pull knife vertically and adjust it to a narrower width as the loin pull knife rises, thereby controlling the fat thickness left on the loin.

38. A loin pull and rib cut machine according to claim 37 wherein said U-shaped loin pull knife is flexible to vary the width of the loin, cut thereby and means is responsive to the size of the pork side to control the fat thickness left on the loin.

39. A loin pull and rib cut machine according to claim 1 wherein means is provided to lift said loin pull knife to follow the contour of the pork side, and then lower it to resume cutting the loin.

40. A loin pull and rib cut machine according to claim 39 wherein said scribe saw is initially diagonal to the line of travel of said conveyor means, and is thereafter positioned substantially parallel to the line of travel of said conveyor means, and said means operable to lift the loin pull knife comprises cam and roller means to effect such lifting upon said scribe saw knife assuming said diagonal position.

References Cited

UNITED STATES PATENTS

| | | | |
|---|---|---|---|
| 2,510,173 | 6/1950 | Harter | 17—23 |
| 3,159,869 | 12/1964 | Vogt et al. | 17—1 |

LUCIE H. LAUDENSLAGER, Primary Examiner